(12) United States Patent
Hong et al.

(10) Patent No.: US 7,709,586 B2
(45) Date of Patent: May 4, 2010

(54) OLEFIN POLYMERIZATION CATALYST AND OLEFIN POLYMERIZATION PROCESS USING THE SAME

(75) Inventors: Sah-Mun Hong, Daejeon (KR); Sung-Woo Kang, Daejeon (KR); Young-Jae Jun, Daejeon (KR); Jin-Sook Oh, Daejeon (KR)

(73) Assignee: Daelim Industrial Co., Ltd., Seoul (KR)

( * ) Notice: Subject to any disclaimer, the term of this patent is extended or adjusted under 35 U.S.C. 154(b) by 642 days.

(21) Appl. No.: 11/638,527

(22) Filed: Dec. 14, 2006

(65) Prior Publication Data
US 2007/0142221 A1 Jun. 21, 2007

(30) Foreign Application Priority Data
Dec. 16, 2005 (KR) ............... 10-2005-0124863

(51) Int. Cl.
*C08F 4/50* (2006.01)
*C08F 4/52* (2006.01)
*C08F 4/64* (2006.01)
*B01J 31/14* (2006.01)
*B01J 31/38* (2006.01)

(52) U.S. Cl. .......... 526/162; 526/160; 526/170; 526/943; 526/941; 526/185; 526/183; 526/190; 526/348; 526/348.2; 526/348.3; 526/348.5; 526/318.6; 526/351; 526/352; 526/280; 526/281; 526/336; 526/308; 502/117; 502/103; 502/104

(58) Field of Classification Search ........ 502/133, 502/118, 152; 526/151, 153, 158, 162, 160, 526/170
See application file for complete search history.

(56) References Cited

U.S. PATENT DOCUMENTS

| | | | |
|---|---|---|---|
| 4,404,344 A | 9/1983 | Sinn et al. | |
| 4,808,561 A | 2/1989 | Welborn, Jr. | |
| 4,874,880 A | 10/1989 | Miya et al. | |
| 5,324,800 A | 6/1994 | Welborn, Jr. et al. | |
| 5,529,965 A * | 6/1996 | Chang | 502/110 |
| 6,211,106 B1 * | 4/2001 | Tsai et al. | 502/125 |

FOREIGN PATENT DOCUMENTS

| KR | 2000-0026665 A | 5/2000 |
|---|---|---|
| WO | WO 01/49748 A1 * | 7/2001 |

* cited by examiner

*Primary Examiner*—David Wu
*Assistant Examiner*—Rip A. Lee
(74) *Attorney, Agent, or Firm*—Birch, Stewart, Kolasch & Birch, LLP

(57) ABSTRACT

An olefin polymerization catalyst which includes an organometallic compound of the following Formula 1; aluminoxane; and an organic transition metal compound of the following Formula 2:

$$M^1R^1{}_lR^2{}_mR^3{}_n \text{ or } R^2{}_mR^3{}_nM^1R^1{}_lM^1R^2{}_mR^3{}_n \quad \text{[Formula 1]}$$

in Formula 1, $M^1$ is selected from the group consisting of Group 2A, 2B and 3A of the Periodic Table, $R^1$ is cyclic hydrocarbyl group of 5 to 30 carbon atoms, $R^2$ and $R^3$ are independently hydrocarbyl group of 1 to 24 carbon atoms, l is an integer of more than 1, m and n are independently an integer of 0 to 2, l+m+n is equal to the valence of $M^1$, Q is a divalent group;

$$M^2R^4{}_pX_q \quad \text{[Formula 2]}$$

in Formula 2, $M^2$ is Ti, Zr or Hf; $R^4$ is cyclic hydrocarbyl group of 5 to 30 carbon atoms, X is halogen atom, p is an integer of 0 or 1, q is an integer of 3 or 4, p+q is equal to the valence of metal $M^2$.

8 Claims, 1 Drawing Sheet

OLEFIN POLYMERIZATION CATALYST AND OLEFIN POLYMERIZATION PROCESS USING THE SAME

FIELD OF THE INVENTION

This invention relates to olefin polymerization catalysts and olefin polymerization processes using the same, and more particularly to olefin polymerization catalysts which are obtained by a simple method and exhibit mild onset of polymerization, improved reaction kinetic profile, and high productivity over an increased catalyst lifetime while a polymer product characterized by good morphology and high bulk density and olefin polymerization processes using the same.

BACKGROUNDS OF THE INVENTION

To produce polyolefins, especially ethylene polymer or ethylene/α-olefin copolymer having a good impact strength and transparency, a metallocene catalyst system consisting of an organometallic compound (generally, metallocene) and an activator such as methylaluminoxane, wherein the organometallic compound has ligands such as cyclopentadienyl group, indenyl group, cycloheptadienyl group and fluorenyl group, which can control a stereoregularity and polymer molecular weight is disclosed in German Patent No. 3,007,725, U.S. Pat. Nos. 4,404,344, 4,874,880 and 5,324,800. Also, recently solid catalysts prepared by supporting both a metallocene compound and an activator into an inorganic carrier are disclosed in U.S. Pat. No. 4,808,561 and Korean Patent application No. 1998-44308. The non-uniform solid catalysts are capable of controlling the particle form of the polymer in the slurry or gas phase process. However, in the disclosed metallocene catalyst system, the catalysts are not obtained until various reaction steps are accompanied under complicated synthesis condition.

The supported solid catalysts used in gas phase and slurry process have to maintain a polymer of acceptable morphology and bulk density. In spite of the high activity characteristic of metallocene catalysts, polymer morphology and bulk density problems may result because the supported catalyst exhibits high activity in early duration when it is injected into reactor. This results in to rapid polymerization and severe fracturing of the catalyst particles leading to make the trouble to process operation.

SUMMARY OF THE INVENTION

Therefore, it is an object of the present invention to provide an olefin polymerization catalyst which is obtained by a simple method and have good activity commercially.

It is other object of the present invention to provide an olefin polymerization catalyst which exhibits mild onset of polymerization, improved reaction kinetic profile, and high productivity over an increased catalyst lifetime while a polymer product characterized by good morphology and high bulk density.

It is another object of the present invention to provide an olefin polymerization process using an olefin polymerization catalyst.

To accomplish these and other objects, the present invention provides an olefin polymerization catalyst comprising an organometallic compound of the following Formula 1; aluminoxane; and an organic transition metal compound of the following Formula 2:

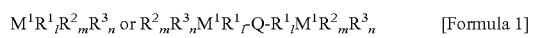  [Formula 1]

in Formula 1, $M^1$ is selected from the group consisting of Group 2A, 2B and 3A of the Periodic Table, $R^1$ is cyclic hydrocarbyl group of 5 to 30 carbon atoms having at least 2 conjugated double bonds, $R^2$ and $R^3$ are independently hydrocarbyl group of 1 to 24 carbon atoms, l is an integer of more than 1 and an integer of less than a valence of $M^1$, m and n are independently an integer of 0 to 2, l+m+n is equal to the valence of $M^1$, Q is a divalent group selected from the group consisting of $(CR^5{}_2)_b$, $(SiR^5{}_2)_b$, $(GeR^5{}_2)_b$, $NR^5$ and $PR^5$ for bridging $R^1$, here $R^5$ substituent is independently hydrogen atom, alkyl radical of 1 to 20 carbon atoms, cycloalkyl radical of 3 to 20 carbon atoms, alkenyl radical of 1 to 20 carbon atoms, aryl radical of 6 to 20 carbon atoms, alkyl radical of 7 to 20 carbon atoms or arylalkyl radical of 7 to 20 carbon atoms, b is an integer of 1 to 4, when Q is $(CR^5{}_2)_b$, $(SiR^5{}_2)_b$ or $(GeR^5{}_2)_b$, $R^5$ that two substituents bonded with carbon(C), silicon(Si), germanium(Ge) can be bonded each other to form a ring of 2 to 7 carbon atoms;

  [Formula 2]

in Formula 2, $M^2$ is titanium (Ti), zirconium (Zr) or hafnium (Hf), $R^4$ is cyclic hydrocarbyl group of 5 to 30 carbon atoms having at least 2 conjugated double bonds, X is halogen atom, p is an integer of 0 or 1, q is an integer of 3 or 4, p+q is equal to the valence of metal $M^2$.

The present invention also provides an olefin polymerization catalyst which is prepared more by contacting the olefin polymerization catalyst produced by mixing an organometallic compound of the above Formula 1; aluminoxane; and an organic transition metal compound of the above Formula 2 with an organic or inorganic carrier. The present invention also provides an olefin polymerization process including the step of at least one olefin polymerization in the presence of the catalyst.

DETAILED DESCRIPTION OF THE INVENTION

Figure 1:
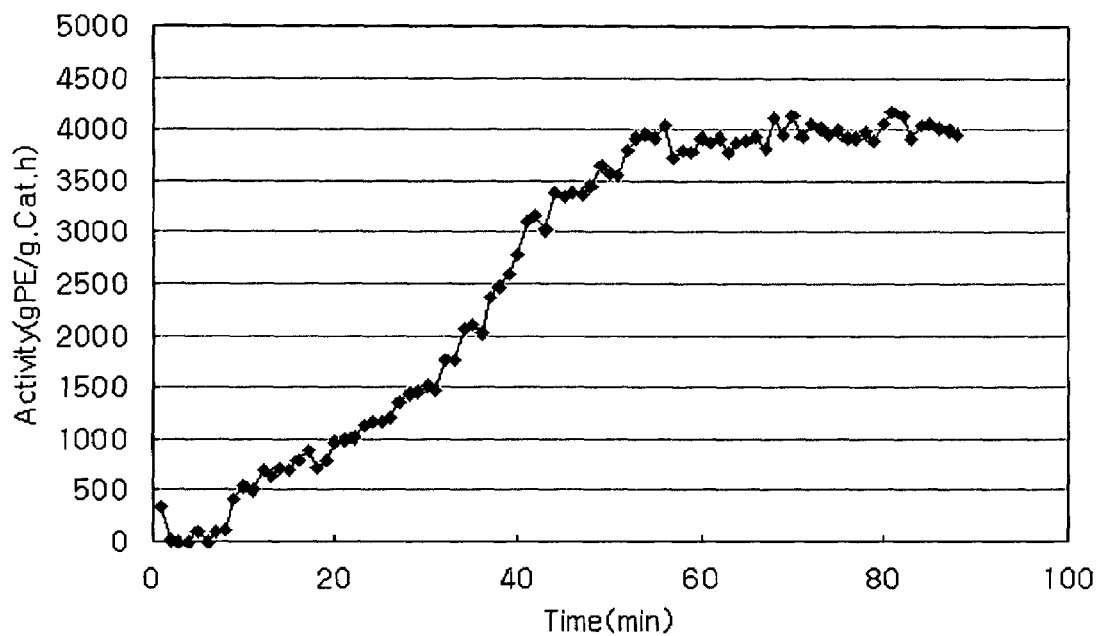
FIG. 1 is a diagram showing a polymerization rate of the polymerization reaction according to an experimental example of the present invention.

A more complete appreciation of the invention, and many of the attendant advantages thereof, will be better appreciated by reference to the following detailed description.

The olefin polymerization catalyst according to the present invention comprises an organometallic compound of the following Formula 1; aluminoxane; and an organic transition metal compound of the following Formula 2:

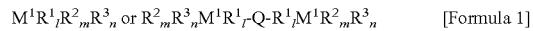  [Formula 1]

in Formula 1, $M^1$ is selected from the group consisting of Group 2A, 2B and 3A of the Periodic Table, $R^1$ is cyclic hydrocarbyl group of 5 to 30 carbon atoms having at least 2 conjugated double bonds, $R^2$ and $R^3$ are independently hydrocarbyl group of 1 to 24 carbon atoms, l is an integer of more than 1 and an integer of less than a valence of $M^1$, m and n are independently an integer of 0 to 2, l+m+n is equal to the valence of $M^1$, Q is a divalent group selected from the group consisting of $(CR^5{}_2)_b$, $(SiR^5{}_2)_b$, $(GeR^5{}_2)_b$, $NR^5$ and $PR^5$ for bridging $R^1$, here $R^5$ substituent is independently hydrogen atom, alkyl radical of 1 to 20 carbon atoms, cycloalkyl radical of 3 to 20 carbon atoms, alkenyl radical of 1 to 20 carbon atoms, aryl radical of 6 to 20 carbon atoms, alkyl radical of 7 to 20 carbon atoms or arylalkyl radical of 7 to 20 carbon atoms, b is an integer of 1 to 4, when Q is $CR^5{}_2)_b$, $(SiR^5{}_2)_b$ or $(GeR^5{}_2)_b$, $R^5$ that two substituents bonded with carbon(C), silicon(Si), germanium(Ge) can be bonded each other to form a ring of 2 to 7 carbon atoms;

   [Formula 2]

in Formula 2, $M^2$ is titanium (Ti), zirconium (Zr) or hafnium (Hf), $R^4$ is cyclic hydrocarbyl group of 5 to 30 carbon atoms having at least 2 conjugated double bonds, X is halogen atom, p is an integer of 0 or 1, q is an integer of 3 or 4, p+q is equal to the valence of metal $M^2$.

The organometallic compound of Formula 1 is explained as follows.

$M^1$ is selected from the group consisting of Group 2A, 2B and 3B of the Periodic Table, preferably are selected from magnesium (Mg), zinc (Zn), boron (B), aluminum (Al), gallium (Ga), indium (In) or thallium (Tl), more preferably are selected from magnesium (Mg) or aluminum (Al).

$R^1$ is a substituted or unsubstituted cyclic hydrocarbyl group of 5 to 30 carbon atoms having at least 2 conjugated double bonds. The preferable number of conjugated double bond is 2 to 4, more preferably is 2 or 3. The preferable carbon atoms number of cyclic hydrocarbyl is 5 to 13. The specific non-limiting examples of $R^1$ includes cyclopentadienyl, substituted cyclopentadienyl, indenyl, substituted indenyl, azulene, substituted azulene, fluorenyl and substituted fluorenyl group. Also, $R^1$ can be partially replaced with 1 to 6 substituents, which are selected from the group consisting of alkyl of 1 to 20 carbon atoms, alkenyl of 3 to 20 carbon atoms, cycloalkyl of 3 to 20 carbon atoms, haloalkyl of 1 to 20 carbon atoms, aryl of 6 to 20 carbon atoms, arylalkyl of 6 to 20 carbon atoms, arylsilyl of 6 to 20 carbon atoms, alkylaryl of 6 to 20 carbon atoms, alkoxy of 1 to 20 carbon atoms, alkylsiloxy of 1 to 20 carbon atoms, aryloxy of 6 to 20 carbon atoms, halogen atom, amino group and the mixtures thereof. $R^2$ and $R^3$ are independently hydrocarbyl group of 1 to 24 carbon atoms, preferably hydrocarbyl group of 1 to 12 carbon atoms, specifically alkyl such as methyl, ethyl, propyl, isopropyl, butyl, t-butyl, isobutyl, pentyl, hexyl, octyl, cycloalkyl such as cyclopentyl, cyclohexyl, cycloheptyl, aryl such as phenyl, arylalkyl such as benzyl or so on. Also, l is an integer of more than 1 and an integer of less than a valence of $M^1$, m and n are independently an integer of 0 to 2, l+m+n is equal to the valence of $M^1$, Q is a divalent group selected from the group consisting of $(CR^5{}_2)_b$, $(SiR^5{}_2)_b$, $(GeR^5{}_2)_b$, $NR^5$ and $PR^5$ for bridging $R^1$, here $R^5$ substituent is independently hydrogen atom, alkyl radical of 1 to 20 carbon atoms, cycloalkyl radical of 3 to 20 carbon atoms, alkenyl radical of 1 to 20 carbon atoms, aryl radical of 6 to 20 carbon atoms, alkyl radical of 7 to 20 carbon atoms or arylalkyl radical of 7 to 20 carbon atoms, b is an integer of 1 to 4, preferably an integer of 1 or 2, when Q is $(CR^5{}_2)_b$, $(SiR^5{}_2)_b$ or $(GeR^5{}_2)_b$, $R^5$ that two substituents bonded with carbon (C), silicon (Si), germanium (Ge) can be bonded each other to form a ring of 2 to 7 carbon atoms.

The non-limiting examples of the organometallic compound of Formula 1 according to the present invention include cyclopentadienylmagnesium methyl, cyclopentadienylmagnesium ethyl, cyclopentadienylmagnesium isobutyl, cyclopentadienylmagnesium propyl, cyclopentadienylmagnesium heptyl, cyclopentadienylmagnesium octyl, methylcyclopentadienylmagnesium methyl, methylcyclopentadienylmagnesium ethyl, methylcyclopentadienylmagnesium isobutyl, methylcyclopentadienylmagnesium propyl, methylcyclopentadienylmagnesium heptyl, methylcyclopentadienylmagnesium octyl, 1,2,3,4-tetramethylcyclopentadienylmagnesium methyl, 1,2,3,4-tetramethylcyclopentadienylmagnesium ethyl, 1,2,3,4-tetramethylcyclopentadienylmagnesium isobutyl, 1,2,3,4-tetramethylcyclopentadienylmagnesium propyl, 1,2,3,4-tetramethylcyclopentadienylmagnesium heptyl, 1,2,3,4-tetramethylcyclopentadienylmagnesium octyl, ethylcyclopentadienylmagnesium methyl, ethylcyclopentadienylmagnesium ethyl, ethylcyclopentadienylmagnesium isobutyl, ethylcyclopentadienylmagnesium propyl, ethylcyclopentadienylmagnesium heptyl, ethylcyclopentadienylmagnesium octyl, propylcyclopentadienylmagnesium methyl, propylcyclopentadienylmagnesium ethyl, propylcyclopentadienylmagnesium isobutyl, propylcyclopentadienylmagnesium propyl, propylcyclopentadienylmagnesium heptyl, propylcyclopentadienylmagnesium octyl, butylcyclopentadienylmagnesium methyl, butylcyclopentadienylmagnesium ethyl, butylcyclopentadienylmagnesium isobutyl, butylcyclopentadienylmagnesium propyl, butylcyclopentadienylmagnesium heptyl, butylcyclopentadienylmagnesium octyl, isobutylcyclopentadienylmagnesium methyl, isobutylcyclopentadienylmagnesium ethyl, isobutylcyclopentadienylmagnesium isobutyl, isobutylcyclopentadienylmagnesium propyl, isobutylcyclopentadienylmagnesium heptyl, isobutylcyclopentadienylmagnesium octyl, octadecylcyclopentadienylmagnesium methyl, octadecylcyclopentadienylmagnesium ethyl, octadecylcyclopentadienylmagnesium isobutyl, octadecylcyclopentadienylmagnesium propyl, octadecylcyclopentadienylmagnesium heptyl, octadecylcyclopentadienylmagnesium octyl, cyclopentylcyclopentadienylmagnesium methyl, cyclopentylcyclopentadienylmagnesium ethyl, cyclopentylcyclopentadienylmagnesium isobutyl, cyclopentylcyclopentadienylmagnesium propyl, cyclopentylcyclopentadienylmagnesium heptyl, cyclopentylcyclopentadienylmagnesium octyl, cyclohexylcyclopentadienylmagnesium methyl, cyclohexylcyclopentadienylmagnesium ethyl, cyclohexylcyclopentadienylmagnesium isobutyl, cyclohexylcyclopentadienylmagnesium propyl, cyclohexylcyclopentadienylmagnesium heptyl, cyclohexylcyclopentadienylmagnesium octyl, 1,3-butylmethylcyclopentadienylmagnesium methyl, 1,3-butylmethylcyclopentadienylmagnesium ethyl, 1,3-butylmethylcyclopentadienylmagnesium isobutyl, 1,3-butylmethylcyclopentadienylmagnesium propyl, 1,3-butylmethylcyclopentadienylmagnesium heptyl, 1,3-butylmethylcyclopentadienylmagnesium octyl, bis(cyclopentadienyl)magnesium, bis(alkyl-cyclopentadienyl)magnesium, bis(indenyl)magnesium, bis(alkyl-indenyl)magnesium, indenylmagnesium methyl, indenylmagnesium ethyl, indenylmagnesium isobutyl, indenylmagnesium propyl, indenylmagnesium heptyl, indenylmagnesium octyl, 2-methylindenylmagnesium methyl, 2-methylindenylmagnesium ethyl, 2-methylindenylmagnesium isobutyl, 2-methylindenylmagnesium propyl, 2-methylindenylmagnesium heptyl, 2-methylindenylmagnesium octyl, 3-methylindenylmagnesium methyl, 3-methylindenylmagnesium ethyl, 3-methylindenylmagnesium isobutyl, 3-methylindenylmagnesium propyl, 3-methylindenylmagnesium heptyl, 3-methylindenylmagnesium octyl, 2-phenylindenylmagnesium methyl, 2-phenylindenylmagnesium ethyl, 2-phenylindenylmagnesium isobutyl, 2-phenylindenylmagnesium propyl, 2-phenylindenylmagnesium heptyl, 2-phenylindenylmagnesium octyl, 3-phenylindenylmagnesium methyl, 3-phenylindenylmagnesium ethyl, 3-phenylindenylmagnesium isobutyl, 3-phenylindenylmagnesium propyl, 3-phenylindenylmagnesium heptyl, 3-phenylindenylmagnesium octyl, fluorenylmagnesium methyl, fluorenylmagnesium ethyl, fluorenylmagnesium isobutyl, fluorenylmagnesium propyl, fluorenylmagnesium heptyl, fluorenylmagnesium octyl, cyclopentadienylaluminum dimethyl, cyclopentadienylaluminum diethyl, cyclopentadienylaluminum diisobutyl, cyclopentadienylaluminum dipropyl, cyclopentadienylaluminum diheptyl, cyclopentadienylaluminum dioctyl, methylcyclopentadienylaluminum dimethyl, methylcyclopentadienylaluminum diethyl, methylcyclopentadienylaluminum diisobutyl, methylcyclopentadienylaluminum dipropyl, methylcyclopentadienylaluminum diheptyl, methylcyclopentadienylaluminum dioctyl, 1,2,3,4-tetramethylcyclopentadienylaluminum dimethyl, 1,2,3,4-tetramethylcyclopentadienylaluminum diethyl, 1,2,3,4-tetramethylcyclopentadienylaluminum diisobutyl, 1,2,3,4-tetramethylcyclopentadienylaluminum dipropyl, 1,2,3,4-tetramethylcyclopentadienylaluminum diheptyl, 1,2,3,4-tetramethylcyclopentadienylaluminum dioctyl, ethylcyclopentadienylaluminum dimethyl, ethylcyclopentadienylaluminum diethyl, ethylcyclopentadienylaluminum diisobutyl, ethylcyclopentadienylaluminum dipropyl, ethylcyclopentadienylaluminum diheptyl, ethylcyclopentadienylaluminum dioctyl, propylcyclopentadienylaluminum dimethyl, propylcyclopentadienylaluminum diethyl, propylcyclopentadienylaluminum diisobutyl, propylcyclopentadienylaluminum dipropyl, propylcyclopentadienylaluminum diheptyl, propylcyclopentadienylaluminum dioctyl, butylcyclopentadienylaluminum dimethyl, butylcyclopentadienylaluminum diethyl, butylcyclopentadienylaluminum diisobutyl, butylcyclopentadienylaluminum dipropyl, butylcyclopentadienylaluminum diheptyl, butylcyclopentadienylaluminum dioctyl, isobutylcyclopentadienylaluminum dimethyl, isobutylcyclopentadienylaluminum diethyl, isobutylcyclopentadienylaluminum diisobutyl, isobutylcyclopentadienylaluminum dipropyl, isobutylcyclopentadienylaluminum diheptyl, isobutylcyclopentadienylaluminum dioctyl, octadecylcyclopentadienylaluminum dimethyl, cyclopentadienylaluminum diethyl, octadecylcyclopentadienylaluminum diisobutyl, octadecylcyclopentadienylaluminum dipropyl, octadecylcyclopentadienylaluminum diheptyl, octadecylcyclopentadienylaluminum dioctyl, cyclopentylcyclopentadienylaluminum dimethyl, cyclopentylcyclopentadienylaluminum diethyl, cyclopentylcyclopentadienylaluminum diisobutyl, cyclopentylcyclopentadienylaluminum dipropyl, cyclopentylcyclopentadienylaluminum diheptyl, cyclopentylcyclopentadienylaluminum dioctyl, cyclohexylcyclopentadienylaluminum dimethyl, cyclohexylcyclopentadienylaluminum diethyl, cyclohexylcyclopentadienylaluminum diisobutyl, cyclohexylcyclopentadienylaluminum dipropyl, cyclohexylcyclopentadienylaluminum diheptyl, cyclohexylcyclopentadienylaluminum dioctyl, 1,3-butylmethylcyclopentadienylaluminum dimethyl, 1,3-butylmethylcyclopentadienylaluminum diethyl, 1,3-butylmethylcyclopentadienylaluminum diisobutyl, 1,3-butylmethylcyclopentadienylaluminum dipropyl, 1,3-butylmethylcyclopentadienylaluminum diheptyl, 1,3-butylmethylcyclopentadienylaluminum dioctyl, indenylaluminum dimethyl, indenylaluminum diethyl, indenylaluminum diisobutyl, indenylaluminum dipropyl, indenylaluminum diheptyl, indenylaluminum dioctyl, 2-methylindenylaluminum dimethyl, 2-methylindenylaluminum diethyl, 2-methylindenylaluminum diisobutyl, 2-methylindenylaluminum dipropyl, 2-methylindenylaluminum diheptyl, 2-methylindenylaluminum dioctyl, 3-methylindenylaluminum dimethyl, 3-methylindenylaluminum diethyl, 3-methylindenylaluminum diisobutyl, 3-methylindenylaluminum dipropyl, 3-methylindenylaluminum diheptyl, 3-methylindenylaluminum dioctyl, 2-phenylindenylaluminum dimethyl, 2-phenylindenylaluminum diethyl, 2-phenylindenylaluminum diisobutyl, 2-phenylindenylaluminum dipropyl, 2-phenylindenylaluminum diheptyl, 2-phenylindenylaluminum dioctyl, 3-phenylindenylaluminum dimethyl, 3-phenylindenylaluminum diethyl, 3-phenylindenylaluminum diisobutyl, 3-phenylindenylaluminum dipropyl, 3-phenylindenylaluminum diheptyl, 3-phenylindenylaluminum dioctyl, fluorenylaluminum dimethyl, fluorenylaluminum diethyl, fluorenylaluminum diisobutyl, fluorenylaluminum dipropyl, fluorenylaluminum diheptyl, fluorenylaluminum dioctyl, bis(cyclopentadienyl)aluminum ethyl, bis(cyclopentadienyl)aluminum methyl, bis(methyl-cyclopentadienyl) aluminum ethyl, tris(cyclopentadienyl)aluminum, tris(methyl-cyclopentadienyl)aluminum, bis(indenyl)aluminum ethyl, bis(methyl-indenyl)aluminum ethyl, tris(indenyl)aluminum, tris(methyl-indenyl)aluminum or so on. These may be used alone or as mixtures of two or more thereof.

The non-limiting examples of the organometallic compound of Formula 1 according to the present invention include bis(methylmagnesium-indenyl)ethane, bis(methylmagnesium-4,5,6,7-tetrahydro-1-indenyl)ethane, 1,3-propanediyl-bis(methylmagnesium-indene), 1,3-propanediyl-bis(methylmagnesium-4,5,6,7-tetrahydro-1-indene), propylene-bis(methylmagnesium-indene), diphenylmethylene-bis(methylmagnesium-indene), propylene-bis(methylmagnesium-fluorene), diphenylmethylene-bis(methylmagnesium-fluorene), bis(ethylmagnesium-indenyl)ethane, bis(ethylmagnesium-4,5,6,7-tetrahydro-1-indenyl)ethane, 1,3-propanediyl-bis(ethylmagnesium-indene), 1,3-propanediyl-bis(ethylmagnesium-4,5,6,7-tetrahydro-1-indene), propylene-bis(ethylmagnesium-indene), diphenylmethylene-bis(ethylmagnesium-indene), propylene-bis(ethylmagnesium-fluorene), diphenylmethylene-bis(ethylmagnesium-fluorene), bis(dimethylaluminum-indenyl)ethane, bis(dimethylaluminum-4,5,6,7-tetrahydro-1-indenyl)ethane, 1,3-propanediyl-bis(dimethylaluminum-indene), 1,3-propanediyl-bis(dimethylaluminum-4,5,6,7-tetrahydro-1-indene), propylene-bis(dimethylaluminum-indene), diphenylmethylene-bis(dimethylaluminum-indene), propylene-bis(dimethylaluminum-fluorene), diphenylmethylene-bis(dimethylaluminum-fluorene), bis(diethylaluminum-indenyl)ethane, bis(diethylaluminum-4,5,6,7-tetrahydro-1-indenyl)ethane, 1,3-propanediyl-bis(diethylaluminum-indene), 1,3-propanediyl-bis(diethylaluminum-4,5,6,7-tetrahydro-1-indene), propylene-bis(diethylaluminum-indene), diphenylmethylene-bis(diethylaluminum-indene), propylene-bis(diethylaluminum-fluorene), diphenylmethylene-bis(diethylaluminum-fluorene) or so on. These may be used alone or as mixtures of two or more thereof.

The present invention provides an aluminoxane of Formula 3 which is an activator and is an impurity scavenger. The aluminoxane may have linear, cyclic, or network structure. The linear aluminoxane may be represented by the following Formula 4 and the circular aluminoxane may be represented by the following Formula 5:

[Formula 3]

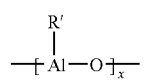

in Formula 3, $R^1$ is a hydrocarbyl radical of 1 to 10 carbon atoms, and x is an integer of 1 to 70,

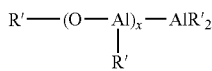

[Formula 4]

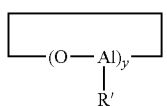

[Formula 5]

in Formulas 4 and 5, independently $R^1$ is a hydrocarbyl radical, preferably a linear or branched alkyl radical of 1 to 10 carbon atoms, and more preferably methyl; x is an integer of 1 to 50, and preferably an integer of 10 to 40; y is an integer of 3 to 50, and preferably an integer of 10 to 40.

The alkyl aluminoxane is commercially available, and the non-limiting examples thereof include methylaluminoxane, ethylaluminoxane, butylaluminoxane, isobutylaluminoxane, hexylaluminoxane, octylaluminoxane and decylaluminoxane. As the aluminoxane, commercially available aluminoxane dissolved in hydrocarbon solution is preferable, aluminoxane dissolved in aromatic hydrocarbon solution is more preferable, and aluminoxane dissolved in toluene is most preferable. A single aluminoxane or mixtures of various aluminoxanes can be used for the present invention. The alkyl aluminoxane can be prepared by various conventional methods. For example, the alkyl aluminoxane can be prepared by adding proper amount of water to trialkylaluminum, or, by reacting hydrocarbyl compound with water or inorganic hydrated salt with trialkylaluminum. From the conventional process, a mixture of linear aluminoxane and cyclic aluminoxane is obtained.

The organic transition metal compound of Formula 2 is explained as follows.

$M^2$ of the organic transition metal compound of Formula 2 may be titanium (Ti), zirconium (Zr) or hafnium (Hf), $R^4$ is a substituted or unsubstituted cyclic hydrocarbyl group of 5 to 30 carbon atoms having at least 2 conjugated double bonds, the preferable number of conjugated double bond is 2 to 4, more preferably is 2 or 3 and the preferable carbon atoms number of cyclic hydrocarbyl is 5 to 13. Specific examples of $R^4$ include cyclopentadienyl, substituted cyclopentadienyl, indenyl, substituted indenyl, azulene, substituted azulene, fluorenyl, substituted fluorenyl or so on. Also, $R^4$ can be partially replaced with 1 to 6 substituents, the substituents are selected from the group consisting of alkyl of 1 to 20 carbon atoms, alkenyl of 3 to 20 carbon atoms, cycloalkyl of 3 to 20 atoms, haloalkyl of 1 to 20 carbon atoms, aryl of 6 to 20 carbon atoms, arylalkyl of 6 to 20 carbon atoms, arylsilyl of 6 to 20 carbon atoms, alkylaryl of 6 to 20 carbon atoms, alkoxy of 1 to 20 carbon atoms, alkylsiloxy of 1 to 20 carbon atoms, aryloxy of 6 to 20 carbon atoms, halogen atom, amino group and the mixtures thereof. Namely, $R^4$ is equal to $R^1$ of Formula 1. X of the organic transition metal compound of the Formula 2 is halogen atom, p is an integer of 0 or 1, q is an integer of 3 or 4, p+q is equal to the valence of metal $M^2$.

The non-limiting examples of the organic transition metal compound of Formula 2 according to the present invention include titanium fluoride, titanium chloride, titanium bromide, titanium iodide, zirconium fluoride, zirconium chloride, zirconium bromide, zirconium iodide, hafnium fluoride, hafnium chloride, hafnium bromide, hafnium iodide, cyclopentadienyltitanium trifluoride, cyclopentadienyltitanium trichloride, cyclopentadienyltitanium tribromide, cyclopentadienyltitanium triiodide, cyclopentadienylzirconium trifluoride, cyclopentadienylzirconium trichloride, cyclopentadienylzirconium tribromide, cyclopentadienylzirconium triiodide, cyclopentadienylhafnium trifluoride, cyclopentadienylhafnium trichloride, cyclopentadienylhafnium tribromide, cyclopentadienylhafnium triiodide, methylcyclopentadienyltitanium trifluoride, methylcyclopentadienyltitanium trichloride, methylcyclopentadienyltitanium tribromide, methylcyclopentadienyltitanium triiodide, methylcyclopentadienylzirconium trifluoride, methylcyclopentadienylzirconium trichloride, methylcyclopentadienylzirconium tribromide, methylcyclopentadienylzirconium triiodide, methylcyclopentadienylhafnium trifluoride, methylcyclopentadienylhafnium trichloride, methylcyclopentadienylhafnium tribromide, methylcyclopentadienylhafnium triiodide, butylcyclopentadienyltitanium trifluoride, butylcyclopentadienyltitanium trichloride, butylcyclopentadienyltitanium tribromide, butylcyclopentadienyltitanium triiodide, butylcyclopentadienylzirconium trifluoride, butylcyclopentadienylzirconium trichloride, butylcyclopentadienylzirconium tribromide, butylcyclopentadienylzirconium triiodide, butylcyclopentadienylhafnium trifluoride, butylcyclopentadienylhafnium trichloride, butylcyclopentadienylhafnium tribromide, butylcyclopentadienylhafnium triiodide, pentamethylcyclopentadienyltitanium trifluoride, pentamethylcyclopentadienyltitanium trichloride, pentamethylcyclopentadienyltitanium tribromide, pentamethylcyclopentadienyltitanium triiodide, pentamethylcyclopentadienylzirconium trifluoride, pentamethylcyclopentadienylzirconium trichloride, pentamethylcyclopentadienylzirconium tribromide, pentamethylcyclopentadienylzirconium triiodide, pentamethylcyclopentadienylhafnium trifluoride, pentamethylcyclopentadienylhafnium trichloride, pentamethylcyclopentadienylhafnium tribromide, pentamethylcyclopentadienylhafnium triiodide, indenyltitanium trifluoride, indenyltitanium trichloride, indenyltitanium tribromide, indenyltitanium triiodide, indenylzirconium trifluoride, indenylzirconium trichloride, indenylzirconium tribromide, indenylzirconium triiodide, indenylhafnium trifluoride, indenylhafnium trichloride, indenylhafnium tribromide, indenylhafnium triiodide, 4,5,6,7-tetrahydroindenyltitanium trifluoride, 4,5,6,7-tetrahydroindenyltitanium trichloride, 4,5,6,7-tetrahydroindenyltitanium tribromide, 4,5,6,7-tetrahydroindenyltitanium triiodide, 4,5,6,7-tetrahydroindenylzirconium trifluoride, 4,5,6,7-tetrahydroindenylzirconium trichloride, 4,5,6,7-tetrahydroindenylzirconium tribromide, 4,5,6,7-tetrahydroindenylzirconium triiodide, 4,5,6,7-tetrahydroindenylhafnium trifluoride, 4,5,6,7-tetrahydroindenylhafnium trichloride, 4,5,6,7-tetrahydroindenylhafnium tribromide, 4,5,6,7-tetrahydroindenylhafnium triiodide, methylindenyltitanium trifluoride, methylindenyltitanium trichloride, methylindenyltitanium tribromide, methylindenyltitanium triiodide, methylindenylzirconium trifluoride, methylindenylzirconium trichloride, methylindenylzirconium tribromide, methylindenylzirconium triiodide, methylindenylhafnium trifluoride, methylindenylhafnium trichloride, methylindenylhafnium tribromide, methylindenylhafnium triiodide, phenylindenyltitanium trifluoride, phenylindenyltitanium trichloride, phenylindenyltitanium tribromide, phenylindenyltitanium triiodide, phenylindenylzirconium trifluoride, phenylindenylzirconium trichloride, phenylindenylzirconium tribromide, phenylindenylzirconium triiodide, phenylindenylhafnium trifluoride, phenylindenylhafnium trichloride, phenylindenylhafnium tribromide, phenylindenylhafnium triiodide, fluorenyltitanium trifluoride, fluorenyltitanium trichloride, fluorenyltitanium tribromide, fluorenyltitanium triiodide, fluorenylzirconium trifluoride, fluorenylzirconium trichloride, fluorenylzirconium tribromide, fluorenylzirconium triiodide, fluorenylhafnium trifluoride, fluorenylhafnium trichloride, fluorenylhafnium tribromide, fluorenylhafnium triiodide or so on. These may be used alone or as mixtures of two or more thereof.

The olefin polymerization catalyst according to the present invention can be prepared by mixing an organometallic compound of the above Formula 1; aluminoxane; and an organic transition metal compound of the above Formula 2, wherein the amount of the organometallic compound of the above Formula 1 is 0.2 to 20 mole, preferably 0.5 to 10 mole per 1 mole of the organic transition metal compound of the above Formula 2 and the amount of aluminum of the aluminoxane is 1 to 100,000 mole, preferably 5 to 2,500 mole per 1 mole of the organic transition metal compound of the above Formula 2. There are no specific limitations to mix the compounds. For example, three compounds may be mixed for 5 minutes to 24 hours, preferably 15 minutes to 16 hours simultaneously, or after mixing the organometallic compound of Formula 1 and aluminoxane for 5 minutes to 10 hours, preferably 15 minutes to 4 hours in advance, the organic transition metal compound of Formula 2 may be added and mixed for 5 minutes to 24 hours, preferably 15 minutes to 16 hours. Although there are no limitations to mix three compounds, the preferable mixing can be carried out without solvents under the inert atmosphere of nitrogen or argon or can be carried out in the presence of an inert hydrocarbon solvent such as heptane, hexane, benzene, toluene, xylene or mixtures thereof. The temperature of the mixing process is 0 to 150° C., preferably 10 to 90° C. The catalyst in a solution state that the catalyst is uniformly dissolved in a hydrocarbon solvent or so on or the catalyst in a solid powder state are available, wherein the catalyst in the solid powder may be prepared by solidifying the precipitant after the precipitation reaction of the catalyst in the solution state.

The present invention also provides an olefin polymerization catalyst which is prepared more by contacting the olefin polymerization catalyst produced by mixing the organometallic compound of the above Formula 1; aluminoxane; and the organic transition metal compound of the above Formula 2 with an organic or inorganic carrier. The catalyst may be supported in a carrier or may be the insoluble particle state of the carrier.

The method for contacting the catalyst according to the present invention with the carrier is provided as follows. However, the present invention is not limited to the following methods. At first, the catalyst in a slurry state is prepared by contacting the catalyst in the solution state produced by mixing the organometallic compound of the above Formula 1; aluminoxane; and the organic transition metal compound of the above Formula 2 with a porous carrier (example: a silica carrier having the minute pore size of 50 to 500 Å and the pore volume of 0.1 to 5.0 cm$^3$/g). Next, the catalyst in the slurry state (mixture) is treated with an acoustic wave or oscillating wave having the frequency of 1 to 10,000 kHz at 0° C. to 120° C. for 1 to 6 hours to penetrate the catalyst constituents into the deep minute pores of the carrier uniformly. And then, the catalyst in the solid powder state is prepared by vacuum treatment of the mixtures or drying of the mixtures under the flow of the nitrogen gas.

The preferable acoustic wave or oscillating wave is an ultrasonic wave, more preferably is the frequency of 20 to 500 kHz. The contacting process of the catalyst and the carrier may further include the steps that the supported catalyst is washed by the hydrocarbon selected from the group consisting of pentane, hexane, heptane, isoparaffin, toluene, xylene and mixtures thereof after applying the acoustic wave or the oscillating wave to the catalyst.

As the carrier, the porous inorganic compound, inorganic salt, or organic compound having minute pores on the surface thereof and large surface area can be used without limitations. The inorganic carrier may be in any form such as powder, grain, flake, foil and fiber so far as the predetermined shape can be maintained in the process for the supported catalyst. Whatever the form of the inorganic carrier is, the maximum length of the inorganic carrier is generally from 5 to 200 µm, preferably from 10 to 100 µm, the preferable surface area of the carrier is 50 to 1,000 m$^2$/g and the preferable pore volume is 0.05 to 5 cm$^3$/g. The inorganic carrier is generally required to carry out the step of removing water or hydroxyl group before use, that step can be performed by calcining the carrier at 200° C. to 900° C. under air or inert atmosphere such as nitrogen, argon, or so on.

The non-limiting examples of the inorganic salt or the inorganic carrier include silica, alumina, bauxite, zeolite, $MgCl_2$, $CaCl_2$, MgO, $ZrO_2$, $TiO_2$, $B_2O_3$, CaO, ZnO, BaO, $ThO_2$, and mixtures thereof, such as $SiO_2$—MgO, $SiO_2$—$Al_2O_3$, $SiO_2$—$TiO_2$, $SiO_2$—$V_2O_5$, $SiO_2$—$CrO_3$, $SiO_2$—$TiO_2$—MgO, or so on, and the above mentioned compounds including small amount of carbonate, sulfate, or nitrate. The non-limiting examples of the organic compound carrier include starch, cyclodextrin, synthetic polymer or so on.

The exemplary solvent useful in contacting the catalyst of the present invention into the carrier includes aliphatic hydrocarbon solvent, such as pentane, hexane, heptane, octane, nonane, decane, undecabe, dodecane, or so on; aromatic hydrocarbon solvent, such as benzene, monochlorobenzene, dichlorobenzene, trichlorobenzene, toluene, or so on; and halogenated aliphatic hydrocarbon solvent, such as dichloromethane, trichloromethane, dichloroethane, trichloroethane, or so on. The solvent or the mixtures thereof can be used for the supporting process.

The amount of the olefin polymerization catalyst which is supported with the carrier can be varied in wide range. The amount of the organometallic compound of the above Formula 1 is 0.2 to 20 mole, preferably 0.5 to 10 mole per 1 mole of the organic transition metal compound of the above Formula 2 and the amount of aluminum of the aluminoxane is 1 to 1,000 mole, preferably 1 to 500 mole per 1 mole of the organic transition metal compound of the above Formula 2.

The present invention provides an olefin polymerization process including the step of at least one olefin polymerization in the presence of the catalyst which is prepared by mixing an organometallic compound of Formula 1; aluminoxane; and an organic transition metal compound of Formula 2, or an olefin polymerization process using the catalyst that the above catalyst is contacted (supported) with an organic or inorganic carrier.

When performing olefin polymerization with the catalyst of the present invention, the catalyst can be used not only in an uniform solution state but also in a supported state or insoluble particle state, in which the catalyst is supported in an inorganic carrier (for example, silica, alumina, silica-alumina mixture, or so on). The catalyst of the present invention for olefin polymerization can be used for solution phase, slurry phase, bulk phase or gas phase polymerization. The conditions for the polymerization reactions can be varied according to the state of the catalyst (homogeneous or heterogeneous phase (supported phase)), polymerization method (solution polymerization, slurry polymerization, gas phase polymerization), target polymer properties or the polymer form.

When the polymerization is carried out in solution phase or slurry phase, a solvent or olefin can be used as the reaction medium. One or two or more olefins can be used for the polymerization. Exemplary solvent includes propane, butane, pentane, hexane, octane, decane, dodecane, cyclopentane, methylcyclopentane, cyclohexane, benzene, toluene, xylene, dichloromethane, chloroethane, 1,2-dichloroethane, chlorobenzene, or so on, and, if desired, mixtures of the solvents can be used.

The olefin catalyst of the present invention can be used for the copolymerization of the monomer/comonomer as well as the polymerization of the monomer. The preferable examples of the olefins for the polymerization or the copolymerization include a-olefins, circular olefins, dienes, trienes, or styrenes.

The α-olefin includes aliphatic olefin of 2 to 12 carbon atoms, preferably 2 to 8 carbon atoms, more specifically includes ethylene, propylene, butene-1, pentene-1, 3-methyl-butene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene, or so on. The α-olefin may be polymerized to form any of a single polymer, alternating copolymer, random copolymer and block copolymer. The copolymerization of the α-olefin includes the copolymerization of ethylene and α-olefin of 3 to 12 carbon atoms, preferably 3 to 8 carbon atoms (ethylene and propylene, ethylene and butene-1, ethylene and hexene-1, ethylene and 4-methylpentene-1, ethylene and octene-1) and the copolymerization of propylene and α-olefin of 2 to 12 carbon atoms, preferably 2 to 8 carbon atoms (propylene and butene-1, propylene and 4-methylpentene-1, propylene and 4-methylbutene-1, propylene and hexene-1, propylene and octene-1).

In the copolymerization of ethylene or propylene and other α-olefin, the amount of α-olefin may be under 90 mole % of the total monomer. In case of the conventional ethylene copolymerization, the amount of α-olefin may be under 40 mole % of the total monomer, preferably under 30 mole %, more preferably under 20 mole %. In case of the conventional propylene copolymerization, the amount of α-olefin may be 1 to 90 mole % of the total monomer, preferably 5 to 90 mole %, more preferably 10 to 70 mole %.

The carbon number of the circular olefin is 3 to 24, preferably 3 to 18, more specifically the examples of the circular olefin include cyclopentene, cyclobutene, cyclohexene, 3-methylcyclohexene, cyclooctene, tetracyclodecene, octacyclodecene, dicyclopentadiene, norbonene, 5-methyl-2-norbonene, 5-ethyl-2-norbonene, 5-isobutyl-2-norbonene, 5,6-dimethyl-2-norbonene, 5,5,6-trimethyl-2-norbonene, ethylene norbonene or so on. The circular olefin may be copolymerized with α-olefin and the amount of the circular olefin is 1 to 50 mole % with respect to the copolymer, preferably 2 to 50 mole %.

The preferable dienes and trienes are the polyenes of 4 to 26 carbon atoms having two or three double bonds, more specifically the examples of dienes and trienes include 1,3-butadiene, 1,4-pentadiene, 1,4-hexadiene, 1,5-hexadiene, 1,9-decadiene, 2-methyl-1,3-butadiene or so on. The preferable examples of styrene include styrene or substituted styrene substituted with alkyl of 1 to 10 carbon atoms, alkoxy of 1 to 10 carbon atoms, halogen, amine, silyl, halogenated alkyl group, or so on.

When performing the polymerization or copolymerization of the olefin with the catalyst of the present invention, the amount of the organic transition metal compound of Formula 2 can be varied in wide range. However, the preferable central metal concentration of the organic transition metal of Formula 2 is $10^{-8}$ to $10^1$ mol/l in the polymerization reaction system, and the more preferable concentration is $10^{-7}$ to $10^{-2}$ mol/l.

The temperature of the polymerization or copolymerization can also be varied in wide range according to the reactant, reaction conditions, or so on. When performing the solution polymerization, the temperature of the polymerization is generally 0 to 250° C., and more preferably 10 to 200° C. When performing the slurry or gas phase polymerization, the temperature of the polymerization is generally 0 to 120° C., and more preferably 20 to 100° C. The pressure for the polymerization reaction is generally atmospheric pressure to 500 kg/cm², and more preferably atmospheric pressure to 50 kg/cm². The polymerization reaction can be carried out in batch type, semi-continuous type, or continuous type. In addition, the polymerization can be carried out by two or more steps of different reaction conditions. The molecular weight of the polymer produced with the olefin polymerization catalyst of the present invention can be controlled by changing the polymerization temperature, or by injecting hydrogen into the polymerization reactor.

The catalyst of the present invention can be used for polymerization of same monomers, or can be used for copolymerization of monomer and comonomer through the pre-polymerization. In pre-polymerization, the amount of the olefin polymer or copolymer is preferably 0.05 to 500 g, more preferably 0.1 to 300 g, and most preferably 0.2 to 100 g with respect to 1 g of the catalyst. The suitable olefin for the pre-polymerization includes α-olefin of 2 to 20 carbon atoms, such as ethylene, propylene, 1-butene, 1-pentene, 4-methyl-1-pentene, 1-hexene, 1-octene, 1-decene, 1-dodecene, 1-tetradecene, 3-methyl-1-butene, 3-methyl-1-pentene, or so on, and the more suitable olefin for the pre-polymerization is the same olefin which will be used in the main polymerization.

Hereinafter, the preferable examples are provided for better understanding of the present invention. However, the present invention is not limited to the following examples. In the following manufacturing examples, the olefin polymerization catalyst was obtained by Schlenk method under blocking air and water. And purified and dried nitrogen was used as an inert gas. Also, solvent was dried under existing inert nitrogen atmosphere and sodium metal. Melt Index (MI) and HLMI (high load Melt Index) of polymer were measured in accordance with ASTM D1238, and density of polymer was measured in accordance with ASTM D 1505.

EXPERIMENTAL EXAMPLE 1

A. Preparation of the Catalyst

After adding indenyl aluminum diethyl (Ind-AlEt$_2$) (252 mg, 1.258 mmol) and methyl aluminoxane (MAO, Albemarle company, 10% toluene solution) (22 ml) into a 500 ml flask under nitrogen atmosphere, and the mixture solution was stirred for 40 minutes at room temperature. The mixture solution was transferred into the flask including zirconium chloride (ZrCl$_4$) (97 mg, 0.42 mmol) and was reacted for 30 minutes to obtain the catalyst solution. Then silica (Ineos company, ES757) (4.0 g) calcined at 220° C. was added into the obtained catalyst solution, and ultrasonic treatment was performed for 1 hour. A supported catalyst was obtained by a series of processes, such as discarding supernatant, washing the remained solid particles with hexane and drying with vacuum.

B. Copolymerization of Ethylene/Hexene-1

A stainless autoclave reactor (1 L) was purged one time with isobutane and five times with ethylene at 85° C. to remove impurities in the reactor, and then cooled to 67° C. Isobutane (400 ml) and triisobutylaluminum (1.0 mmol) for removing impurities were put in the reactor, and then stirred at 75° C. Then, isobutane (100 ml) and the supported catalyst (43 mg), which was obtained in the previous process, were added into the reactor, and then ethylene and 1-hexene (11 ml) was added until the partial pressure of ethylene increased up to 220 psig. The polymerization was performed at 80° C. for 1 hours with maintaining total pressure of reactor to 420 psig. Partial pressure of ethylene was being kept to 220 psig, and 1-hexene was added continuously during polymerization. The amount of 1-hexene was 6 weight % for the amount of the extra adding ethylene, which was measured by Mass Flowmeter. After the completion of polymerization, remained 1-hexene and isobutane were evacuated, polymer (79 g) having free flow property was obtained easily in the reactor. The polymerization rate of the polymerization reaction did not drop but was kept steady. The catalytic activity of polymerization was 2,340 g polymer/g.catalyst.hours. The obtained polymer had MI ((Melt Index, 0.37 g/10 min) and density (0.9320 g/cm$^3$).

EXPERIMENTAL EXAMPLE 2

A. Preparation of the Catalyst

After adding Ind-AlEt$_2$ (240 mg, 1.198 mmol), ZrCl$_4$ (69 mg, 0.296 mmol) and MAO (20 ml) into a 500 ml flask under nitrogen atmosphere, the mixture solution was stirred for 2 hours at room temperature. Then silica (4.0 g) calcined at 220° C. was added into the obtained catalyst solution, and ultrasonic treatment was performed for 1 hour. The supported catalyst was obtained by a series of processes, such as discarding supernatant, washing the remained solid particles with hexane and drying with vacuum.

B. Copolymerization of Ethylene/Hexene-1

The polymer (46 g) was obtained by the same method like the experimental example 1 except using the catalyst (34 mg), which was obtained in the previous process and reacting to polymerize the olefin for 73 minutes. The polymerization rate during the polymerization reaction was kept steady. The catalytic activity of polymerization was 1,100 g polymer/g.catalyst.hours. The obtained polymer had MI (0.27 g/10 min) and density (0.9335 g/cm$^3$).

EXPERIMENTAL EXAMPLE 3

A. Preparation of the Catalyst

The supported catalyst was obtained by the same method like the experimental example 2 except after adding Ind-AlEt$_2$ (240 mg, 1.198 mmol), ZrCl$_4$ (70 mg, 0.3 mmol) and MAO (20 ml) into a 500 ml flask under nitrogen atmosphere, the mixture solution was stirred for 17 hours at room temperature.

B. Copolymerization of Ethylene/Hexene-1

The polymer (75 g) was obtained by the same method like the experimental example 1 except using the catalyst (36 mg), which was obtained in the previous process and reacting to polymerize the olefin for 70 minutes. The polymerization rate during the polymerization reaction was kept steady. The catalytic activity of polymerization was 1,800 g polymer/g.catalyst.hours. The obtained polymer had MI (0.26 g/10 min) and density (0.9351 g/cm$^3$).

EXPERIMENTAL ESAMPLE 4

A. Preparation of the Catalyst

The supported catalyst was obtained by the same method like the experimental example 2 except after adding Ind-AlEt$_2$ (125 mg, 0.624 mmol), ZrCl$_4$ (69 mg, 0.296 mmol) and MAO (20 ml) into a 500 ml flask under nitrogen atmosphere, the mixture solution was stirred for 5 hours at room temperature.

B. Copolymerization of Ethylene/Hexene-1

The polymer (74 g) was obtained by the same method like the experimental example 1 except using the catalyst (38 mg), which was obtained in the previous process and reacting to polymerize the olefin for 81 minutes. The polymerization rate during the polymerization reaction was kept steady. The catalytic activity of polymerization was 1,500 g polymer/g.catalyst.hours. The obtained polymer had MI (0.28 g/10 min) and density (0.9344 g/cm$^3$).

EXPERIMENTAL EXAMPLE 5

A. Preparation of the Catalyst

After adding Ind-AlEt$_2$ (508 mg, 2.567 mmol) and MAO (28 ml) into a 500 ml flask under nitrogen atmosphere, the mixture solution was stirred for 1 hour at room temperature. The mixture solution was transferred into the flask including ZrCl$_4$ (94 mg, 0.403 mmol) and was reacted for 7 hours to obtain the catalyst solution. Then silica (5.0 g) calcined at 220° C. was added into the obtained catalyst solution, and ultrasonic treatment was performed for 1 hour. A supported catalyst obtained by a series of processes, such as discarding supernatant, washing the remained solid particles with hexane and drying with vacuum.

B. Copolymerization of Ethylene/Hexene-1

The polymer (60 g) was obtained by the same method like the experimental example 1 except using the catalyst (36 mg), which was obtained in the previous process and reacting to polymerize the olefin for 80 minutes. The polymerization rate during the polymerization reaction was increased slowly. The catalytic activity of polymerization was 1,300 g polymer/g.catalyst.hours. The obtained polymer had MI (0.26 g/10 min) and density (0.9346 g/cm$^3$).

EXPERIMENTAL EXAMPLE 6

A. Preparation of the Catalyst

The supported catalyst was obtained by the same method like the experimental example 2 except after adding Ind-AlEt$_2$ (85 mg, 0.424 mmol), cyclopentadienylzirconium trichloride (CpZrCl$_3$) (100 mg, 0.38 mmol) and MAO (20 ml) into a 500 ml flask under nitrogen atmosphere, the mixture solution was stirred for 4 hours at room temperature.

B. Copolymerization of Ethylene/Hexene-1

The polymer (123 g) was obtained by the same method like the experimental example 1 except using the catalyst (38 mg), which was obtained in the previous process and reacting to polymerize the olefin for 80 minutes. The polymerization rate during the polymerization reaction was kept steady. The catalytic activity of polymerization was 2,450 g polymer/g.catalyst.hours. The obtained polymer had MI (0.38 g/10 min) and density (0.9316 g/cm$^3$).

EXPERIMENTAL EXAMPLE 7

A. Preparation of the Catalyst

The supported catalyst was obtained by the same method like the experimental example 2 except after adding Ind- AlEt$_2$ (118 mg, 0.589 mmol), CpZrCl$_3$ (103 mg, 0.392 mmol) and MAO (22 ml) into a 500 ml flask under nitrogen atmosphere, the mixture solution was stirred for 23 hours at room temperature.

B. Copolymerization of Ethylene/Hexene-1

The polymer (172 g) was obtained by the same method like the experimental example 1 except using the catalyst (35 mg), which was obtained in the previous process and reacting to polymerize the olefin for 80 minutes. The polymerization rate during the polymerization reaction was kept steady. The catalytic activity of polymerization was 3,700 g polymer/g.catalyst.hours. The obtained polymer had MI (0.45 g/10 min) and density (0.9299 g/cm$^3$).

EXPERIMENTAL EXAMPLE 8

Preparation of the Catalyst

The supported catalyst was obtained by the same method like the experimental example 2 except after adding Ind-AlEt$_2$ (118 mg, 0.589 mmol), CpZrCl$_3$ (232 mg, 0.884 mmol) and MAO (22 ml) into a 500 ml flask under nitrogen atmosphere, the mixture solution was stirred for 19 hours at room temperature.

B. Copolymerization of Ethylene/Hexene-1

The polymer (96 g) was obtained by the same method like the experimental example 1 except using the catalyst (33 mg), which was obtained in the previous process and reacting to polymerize the olefin for 80 minutes. The polymerization rate during the polymerization reaction was kept steady. The catalytic activity of polymerization was 2,200 g polymer/g.catalyst.hours. The obtained polymer had MI (0.11 g/10 min) and density (0.9365 g/cm$^3$).

EXPERICENTAL EXAMPLE 9

A. Preparation of the Catalyst

The supported catalyst was obtained by the same method like the experimental example 2 except after adding Ind-AlEt$_2$ (125 mg, 0.624 mmol), CpZrCl$_3$ (78 mg, 0.297 mmol) and MAO (22 ml) into a 500 ml flask under nitrogen atmosphere, the mixture solution was stirred for 21 hours at room temperature.

B. Copolymerization of Ethylene/Hexene-1

The polymer (148 g) was obtained by the same method like the experimental example 1 except using the catalyst (35 mg), which was obtained in the previous process and reacting to polymerize the olefin for 71 minutes. The polymerization rate during the polymerization reaction was kept steady. The catalytic activity of polymerization was 3,600 g polymer/g.catalyst.hours. The obtained polymer had MI (0.35 g/10 min) and density (0.9316 g/cm$^3$).

EXPERIMENTAL EXAMPLE 10

A. Preparation of the Catalyst

After adding Ind-AlEt$_2$ (118 mg, 0.589 mmol) and MAO (22 ml) into a 500 ml flask under nitrogen atmosphere, the mixture solution was stirred for 1 hour at room temperature. The supported catalyst was obtained by the same method like the experimental example 1 except the mixture solution was transferred into the flask including CpZrCl$_3$ (103 mg, 0.392 mmol) and was reacted for 7 hours.

B. Copolymerization of Ethylene/Hexene-1

The polymer (130 g) was obtained by the same method like the experimental example 1 except using the catalyst (34 mg), which was obtained in the previous process and reacting to polymerize the olefin for 55 minutes. The polymerization rate during the polymerization reaction was kept steady. The catalytic activity of polymerization was 4,200 g polymer/g.catalyst.hours. The obtained polymer had MI (0.37 g/10 min) and density (0.9292 g/cm$^3$).

EXPERICENTAL EXAMPLE 11

A. Preparation of the Catalyst

After adding Ind-AlEt$_2$ (118 mg, 0.589 mmol) and MAO (22 ml) into a 500 ml flask under nitrogen atmosphere, the mixture solution was stirred for 1 hour at room temperature. The supported catalyst was obtained by the same method like the experimental example 1 except the mixture solution was transferred into the flask including CpZrCl$_3$ (109 mg, 0.415 mmol) and was reacted for 4 hours.

B. Copolymerization of Ethylene/Hexene-1

The polymer (153 g) was obtained by the same method like the experimental example 1 except using the catalyst (35 mg), which was obtained in the previous process and reacting to polymerize the olefin for 50 minutes. The polymerization rate during the polymerization reaction was kept steady. The catalytic activity of polymerization of the catalyst was 5,300 g polymer/g.catalyst.hours. The obtained polymer had MI (0.39 g/10 min) and density (0.9293 g/cm$^3$).

C. Homopolymerization of Ethylene

The polymer (140 g) was obtained by the same method like the experimental example 1 except using the catalyst (35 mg), which was obtained in the previous process and reacting to polymerize the olefin for 45 minutes without using hexene-1. The polymerization rate during the polymerization reaction was increased slowly. The catalytic activity of polymerization was 5,400 g polymer/g.catalyst.hours. The obtained polymer had MI (0.08 g/10 min) and density (0.9413 g/cm$^3$).

EXPERIMENTAL EXAMPLE 12

A. Preparation of the Catalyst

After adding Ind-AlEt$_2$ (118 mg, 0.589 mmol) and MAO (22 ml) into a 500 ml flask under nitrogen atmosphere, the mixture solution was stirred for 1 hour at room temperature. The supported catalyst was obtained by the same method like the experimental example 1 except the mixture solution was transferred into the flask including CpZrCl$_3$ (110 mg, 0.418 mmol) and was reacted for 2 hours.

B. Copolymerization of Ethylene/Hexene-1

The polymer (136 g) was obtained by the same method like the experimental example 1 except using the catalyst (34 mg), which was obtained in the previous process and reacting to polymerize the olefin for 60 minutes. The polymerization rate during the polymerization reaction was kept steady. The catalytic activity of polymerization was 4,000 g polymer/g.catalyst.hours. The obtained polymer had MI (0.35 g/10 min) and density (0.930 g/cm$^3$).

C. Homopolymerization of Ethylene

The polymer (149 g) was obtained by the same method like the experimental example 1 except using the catalyst (35 mg), which was obtained in the previous process and reacting to polymerize the olefin for 69 minutes without using hexene-1. The polymerization rate during the polymerization reaction was increased slowly. The catalytic activity of polymerization was 3,700 g polymer/g.catalyst.hours. The obtained polymer had MI (0.08 g/10 min) and density (0.9419 g/cm$^3$).

EXPERIMENTAL EXAMPLE 13

A. Preparation of the Catalyst

After adding Ind-AlEt$_2$ (118 mg, 0.589 mmol) and MAO (22 ml) into a 500 ml flask under nitrogen atmosphere, the mixture solution was stirred for 40 minutes at room temperature. The supported catalyst was obtained by the same method like the experimental example 1 except the mixture solution was transferred into the flask including CpZrCl$_3$ (112 mg, 0.426 mmol) and was reacted for 30 minutes.

B. Copolymerization of Ethylene/Hexene-1

The polymer (146 g) was obtained by the same method like the experimental example 1 except using the catalyst (32 mg), which was obtained in the previous process and reacting to polymerize the olefin for 54 minutes. The polymerization rate during the polymerization reaction was kept steady. The catalytic activity of polymerization was 5,060 g polymer/g.catalyst.hours. The obtained polymer had MI (0.47 g/10 min) and density (0.9274 g/cm$^3$).

EXPERIMENTAL EXAMPLE 14

A. Preparation of the Catalyst

After adding Ind-AlEt$_2$ (119 mg, 0.594 mmol) and MAO (22 ml) into a 500 ml flask under nitrogen atmosphere, the mixture solution was stirred for 1 hour at room temperature. After the termination of the heat treatment, the supported catalyst was obtained by the same method like the experimental example 1 except the mixture solution was transferred into the flask including CpZrCl$_3$ (55 mg, 0.21 mmol) and cyclopentadienylhafnium trichloride (CpHfCl$_3$) (73 mg, 0.21 mmol) and was reacted for 5 hours.

B. Copolymerization of Ethylene/Hexene-1

The polymer (130 g) was obtained by the same method like the experimental example 1 except using the catalyst (33 mg), which was obtained in the previous process and reacting to polymerize the olefin for 70 minutes. The polymerization rate during the polymerization reaction was kept steady. The catalytic activity of polymerization was 3,400 g polymer/g.catalyst.hours. The obtained polymer had MI (0.34 g/10 min) and density (0.9305 g/cm$^3$).

EXPERIMENTAL EXAMPLE 15

A. Preparation of the Catalyst

After adding Bis(indenyl)ethylaluminum [(Ind)$_2$AlEt] (111 mg) and MAO (22 ml) into a 500 ml flask under nitrogen atmosphere, the mixture solution was stirred for 30 minutes at room temperature. The solution was transferred into the flask including CpZrCl$_3$ (72 mg) and was reacted for 30 minutes at 60° C. Then silica (Ineos company, ES70Y) (4.0 g) calcined at 220° C. was added into the obtained solution, and ultrasonic treatment was performed for 1.5 hour. A supported catalyst was obtained by a series of processes, such as discarding supernatant, washing the remained solid particles with hexane and drying with vacuum.

B. Homopolymerization of Ethylene

A stainless autoclave reactor (2L) was purged one time with isobutane and five times with ethylene at 110° C. to remove impurities in the reactor, and then cooled to 80° C. Isobutane (900 ml) were put in the reactor. Then isobutane (100 ml) and the supported catalyst (50 mg), which was obtained in the previous process, were added into the reactor, and then ethylene was added until the partial pressure of ethylene increased up to 110 psig. The polymerization was performed at 80° C. for 1.5 hours with maintaining total pressure of reactor to 290 psig. Partial pressure of ethylene was being kept to 110 psig. After the completion of polymerization, isobutane were evacuated, polymer (220 g) having free flow property was obtained easily in the reactor. The polymerization rate of the polymerization reaction did not drop but was kept steady (FIG. 1). The catalytic activity of polymerization was 2,933 g polymer/g.catalyst.hours. The obtained polymer had MI ((Melt Index, 0.127 g/10 min), density (0.9430 g/cm$^3$) and bulk density of polymer (0.377 g/cc).

COMPARATIVE EXAMPLE 1

A. Preparation of the Catalyst

After adding Bis(n-butylcyclopentadienyl)zirconium dichloride (110 mg) and MAO (22 ml) into a 500 ml flask under nitrogen atmosphere, the mixture solution was stirred for 20 minutes at room temperature. Then silica (Ineos company, ES70Y) (4.0 g) calcined at 220° C. was added into the obtained solution, and ultrasonic treatment was performed for 1.0 hour. A supported catalyst was obtained by a series of processes, such as discarding supernatant, washing the remained solid particles with hexane and drying with vacuum.

B. Homopolymerization of Ethylene

Figure 2:
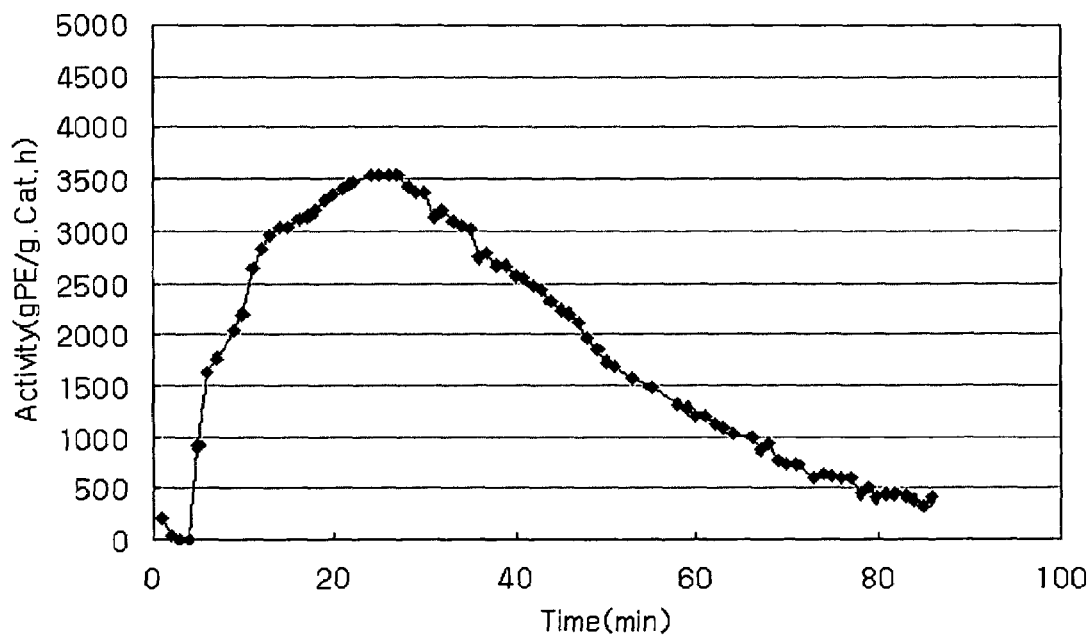
FIG. 2 is a diagram showing a polymerization rate of the polymerization reaction according to a comparative example of the present invention.

The polymer (207 g) was obtained by the same method like the experimental example 15 except using the catalyst (56 mg), which was obtained in the previous process and reacting to polymerize the olefin for 86 minutes. The polymerization rate during the polymerization reaction exhibited decaying profile (FIG. 2). The catalytic activity of polymerization was 2,579 g polymer/g.catalyst.hours. The obtained polymer had MI (0.48 g/10 min), density (0.9450 g/cm$^3$) and bulk density of polymer (0.313 g/cc).

COMPARATIVE EXAMPLE 2

A. Preparation of the Catalyst

After adding methyl aluminoxane (MAO, Albemarle company, 10% toluene solution) (11 ml) and cyclopentadienylzirconium trichloride (CpZrCl$_3$) (55 mg, 0.21 mmol) into a 500 ml flask under nitrogen atmosphere, and the mixture solution was stirred for 3 hours at room temperature. Then silica (Ineos company, ES757) (2.0 g) calcined at 220° C. was added into the obtained catalyst solution, and ultrasonic treatment was performed for 1 hour. A supported catalyst was obtained by a series of processes, such as discarding supernatant, washing the remained solid particles with hexane and drying with vacuum.

B. Copolymerization of Ethylene/Hexene-1

The polymer (3.2 g) was obtained by the same method like the experimental example 1 except using the catalyst (34 mg), which was obtained in the previous process and reacting to polymerize the olefin for 25 minutes. The catalytic activity of polymerization was very low as 226 g polymer/g.catalyst.hours.

COMPARATIVE EXAMPLE 3

A. Preparation of the Catalyst

After adding MAO (11 ml) and ZrCl$_4$ (49 mg, 0.21 mmol) into a 500 ml flask under nitrogen atmosphere, and the mixture solution was stirred for 3 hours at room temperature. Then silica (2.0 g) calcined at 220° C. was added into the obtained catalyst solution, and ultrasonic treatment was performed for 1 hour. A supported catalyst was obtained by a series of processes, such as discarding supernatant, washing the remained solid particles with hexane and drying with vacuum.

B. Copolymerization of Ethylene/Hexene-1

The polymer (1.6 g) was obtained by the same method like the experimental example 1 except using the catalyst (34 mg), which was obtained in the previous process and reacting to polymerize the olefin for 30 minutes. The catalytic activity of polymerization was very low as 95 g polymer/g.catalyst.hours.

The olefin polymerization catalyst according to the present invention can minimize the time and the steps for preparing catalyst because the olefin polymerization catalyst is obtained by a simple method. The typical metallocene olefin polymerization catalysts exhibit high initial polymerization rates and decaying reaction rate profiles, whereas the olefin polymerization catalyst of the present invention has mild onset and the polymerization activity which is kept steady or even is increased. Therefore, the olefin polymerization catalyst of the present invention has high productivity over an increased catalyst lifetime. Also, the olefin polymerization process using the catalyst of the present invention is capable of easily controlling molecular weights, molecular weight distributions and composition distributions of olefin polymer or copolymer in homogeneous polymerization (solution polymerization) condition or in heterogeneous polymerization (gas-phase or slurry-phase polymerization) condition.

The invention claimed is:

1. An olefin polymerization catalyst for the polymerization of α-olefins and cycloolefins which comprises:
an organometallic compound of the following Formula 1;
aluminoxane;
and an organic transition metal compound of the following Formula 2:

$$M^1R^1{}_lR^2{}_mR^3{}_n \text{ or } R^2{}_mR^3{}_nM^1R^1{}_l\text{-}Q\text{-}R^1{}_lM^1R^2{}_mR^3{}_n \qquad [\text{Formula 1}]$$

in Formula 1, $M^1$ is selected from the group consisting of Group 2A, 2B and 3A of the Periodic Table, $R^1$ is selected from the group consisting of cyclopentadienyl, substituted cyclopentadienyl, indenyl, substituted indenyl, azulenyl, substituted azulenyl, fluorenyl, substituted fluorenyl group and mixtures thereof, $R^2$ and $R^3$ are independently hydrocarbyl group of 1 to 24 carbon atoms, l is an integer of more than 1 and an integer of less than a valence of $M^1$, m and n are independently an integer of 0 to 2, l+m+n is equal to the valence of $M^1$, Q is a divalent group selected from the group consisting of $(CR^5{}_2)_b$, $(SiR^5{}_2)_b$, $(GeR^5{}_2)_b$, $NR^5$ and $PR^5$ for bridging $R^1$, where $R^5$ substituent is independently hydrogen atom, alkyl radical of 1 to 20 carbon atoms, cycloalkyl radical of 3 to 20 carbon atoms, alkenyl radical of 1 to 20 carbon atoms, aryl radical of 6 to 20 carbon atoms, alkyl radical of 7 to 20 carbon atoms or arylalkyl radical of 7 to 20 carbon atoms, b is an integer of 1 to 4.

$$M^2R^4{}_pX_q \qquad [\text{Formula 2}]$$

in Formula 2, $M^2$ is zirconium(Zr) or hafnium(Hf), $R^4$ is selected from the group consisting of cyclopentadienyl, substituted cyclopentadienyl, indenyl, substituted indenyl, azulenyl, substituted azulenyl, fluorenyl, substituted fluorenyl groups and mixtures thereof, X is halogen atom, p is an integer of 1, q is an integer of 3, p+q is equal to the valence of metal $M^2$.

2. The olefin polymerization catalyst according to claim 1, wherein $M^1$ is selected from magnesium(Mg) or aluminum (Al); cyclopentadienyl, indenyl, azulenyl or fluorenyl of $R^1$ is partially substituted with 1 to 6 substituents, which are selected from the group consisting of alkyl of 1 to 20 carbon atoms, alkenyl of 3 to 20 carbon atoms, cycloalkyl of 3 to 20 carbon atoms, haloalkyl of 1 to 20 carbon atoms, aryl of 6 to 20 carbon atoms, arylalkyl of 6 to 20 carbon atoms, arylsilyl of 6 to 20 carbon atoms, alkylaryl of 6 to 20 carbon atoms, alkoxy of 1 to 20 carbon atoms, alkylsiloxy of 1 to 20 carbon atoms, aryloxy of 6 to 20 carbon atoms; halogen atom, amino group and mixtures thereof.

3. The olefin polymerization catalyst according to claim 1, wherein the amount of the organoinetallic compound of Formula 1 is 0.2 to 20 mole and the amount of aluminum of the aluminoxane is 1 to 100,000 mole per 1 mole of the organic transition metal compound of the above Formula 2.

4. The olefin polymerization catalyst according to claim 1, wherein the olefin polymerization catalyst is supported on an organic or inorganic earner.

5. The olefin polymerization catalyst according to claim 1, wherein the α-olefin is selected from the group consisting of ethylene, propylene, butene-1, pentene-1, 3-methylbutene-1, hexene-1,4-methylpentene-1,3-methylpentene-1, heptene-1, octene-1, decene-1,4,4-dimethyl-1-pentene, 4,4-diethyl-1-hexene and 3,4-dimethyl-1-hexene, and the cycloolefin is selected from the group consisting of cyclopentene, cyclobutene, cyclohexenc, 3-methylcyclohexene, cyclooctene, tetracyclodecene, octacyclodecene, dicyclopentadiene, norbonene, 5-methyl-2-norbonene, 5-ethyl-2-norbonene, 5-isobutyl-2-norbonene, 5,6-dimethyl-2-norbonene, 5,5,6-trimethyl-2-norbonene and ethylene norbonene.

6. A process for the polymerization of α-olefins and cycloolefins which comprises conducting the poymerization in the presence of a catalyst which is prepared by mixing an organometallic compound of the following Formula 1; aluminoxane; and an organic transition metal compound of the following Formula 2:

$$M^1R^1{}_lR^2{}_mR^3{}_n \text{ or } R^2{}_mR^3{}_nM^1R^1{}_l\text{-}Q\text{-}R^1{}_lM^1R^2{}_mR^3{}_n \qquad [\text{Formula 1}]$$

in Formula 1, $M^1$ is selected from the group consisting of Group 2A, 2B and 3A of the Periodic Table. $R^1$ is selected from the group consisting of cyclopentadienyl, substituted cyclopentadienyl, indenyl, substituted indenyl, azulenyl, substituted azulenyl, fluorenyl, substituted fluorenyl group and mixtures thereof, $R^2$ and $R^3$ are independently hydrocarbyl group of 1 to 24 carbon atoms, l is an integer of more than 1 and an integer of less than a valence of $M^1$, m and n are independently an integer of 0 to 2, l+m+n is equal to the valence of $M^1$, Q is a divalent group selected from the group consisting of $(CR^5{}_2)_b$, $(SiR^5{}_2)_b$, $(GeR^5{}_2)_b$, $NR^5$ and $PR^5$ for bridging $R^1$, where $R^5$ substituent is independently hydrogen atom, alkyl radical of 1 to 20 carbon atoms, cycloalkyl radical of 3 to 20 carbon atoms, alkenyl radical of 1 to 20 carbon atoms, aryl radical of 6 to 20 carbon atoms, alkyl radical of 7 to 20 carbon atoms or arylalkyl radical of 7 to 20 carbon atoms, b is an integer of 1 to 4;

$$M^2R^4{}_pX_q \qquad [\text{Formula 2}]$$

in Formula 2, $M^2$ is zirconium(Zr) or hafnium(Hf), $R^4$ is selected from the group consisting of cyclopentadienyl, substituted cyclopentadienyl, indenyl, substituted indenyl, azulenyl, substituted azulenyl, fluorenyl, substituted fluorenyl group and mixtures thereof, X is halogen atom, p is an integer of 1, q is an integer of 3, p+q is equal to the valence of metal $M^2$.

7. The olefin polymerization process according to claim 6, wherein the olefin polymerization catalyst is supported on an organic or inorganic carrier.

8. The olefin polymerization process according to claim 6, wherein the α-olefin is selected from the group consisting of ethylene, propylene, butene-1, pentene-1,3-methylbutene-1, hexene- 1,4-methylpentene- 1,3-methylpentene-1, heptene-1, octene-1, decene-1,4,4-dimethyl-1-pentene, 4,4-diethyl-1-hexene and 3,4-dimethyl-1-hexene, and the cycloolefin is selected from the group of consisting of cyclopentene, cyclobutene, cyclohexene, 3-methylcyclohexene, cyclooctene, tetracyclodecene, octacyclodecene, dicyclopentadiene, norbonene, 5-methyl-2-norbonene, 5-ethyl-2-norbonene, 5-isobutyl-2-norbonene, 5,6-dimethyl-2-norbonene, 5,5,6-trimethyl-2-norbonene and ethylene norbonene.

* * * * *